March 19, 1940. W. H. MARTIN 2,193,977
WELDER
Filed May 4, 1938 2 Sheets-Sheet 1

Inventor
William H. Martin
By Faust & Crampton
Attorney

March 19, 1940. W. H. MARTIN 2,193,977
WELDER
Filed May 4, 1938 2 Sheets-Sheet 2

Inventor
William H. Martin
By Faust F. Crampton
Attorney

Patented Mar. 19, 1940

2,193,977

UNITED STATES PATENT OFFICE 2,193,977

WELDER

William H. Martin, Detroit, Mich.

Application May 4, 1938, Serial No. 205,960

3 Claims. (Cl. 219—4)

My invention has for its object to provide an efficient welder having parts compactly arranged and formed to efficiently produce welding operations.

As is well known in connection with welders, flexible electrical cables and pipes are used for directing current and cooling liquids to the welding electrodes, and pipes are used for transmitting fluid pressure to operate the electrodes. Also, welders are provided with means for supporting electrodes for conveniently positioning the electrodes to weld parts of the work that are often located at different angles with reference to the work supporting fixture.

The invention provides means whereby the electric cables are confined and the water conductors are reduced in number and the pipes and cables may be connected to one end of the welder which enables convenient handling and manipulation of the welder. The invention also provides an efficient arrangement of parts, whereby one of the electrodes may be supported by replaceable attachments and readily manipulated or located with reference to the welder.

The invention also provides efficient means for connecting the electric conductors to the cylinder for conducting the electric current through the cylinder wall and the piston and through a bracket member to the electrodes.

The invention consists in other features which will appear from the following description and upon examination of the drawings forming a part hereof. Structures containing the invention may partake of different forms and may be varied in their details and still embody the invention. To illustrate a practical application of the invention, I have selected a welder as an example of the various structures that contain the invention and shall describe the selected welder hereinafter, it being understood that certain features of my invention may be used to advantage without a corresponding use of other features of the invention and without departing from the spirit of the invention as presented in the claims. The particular welder selected is shown in the accompanying drawings.

Figures 1, 2, 3:
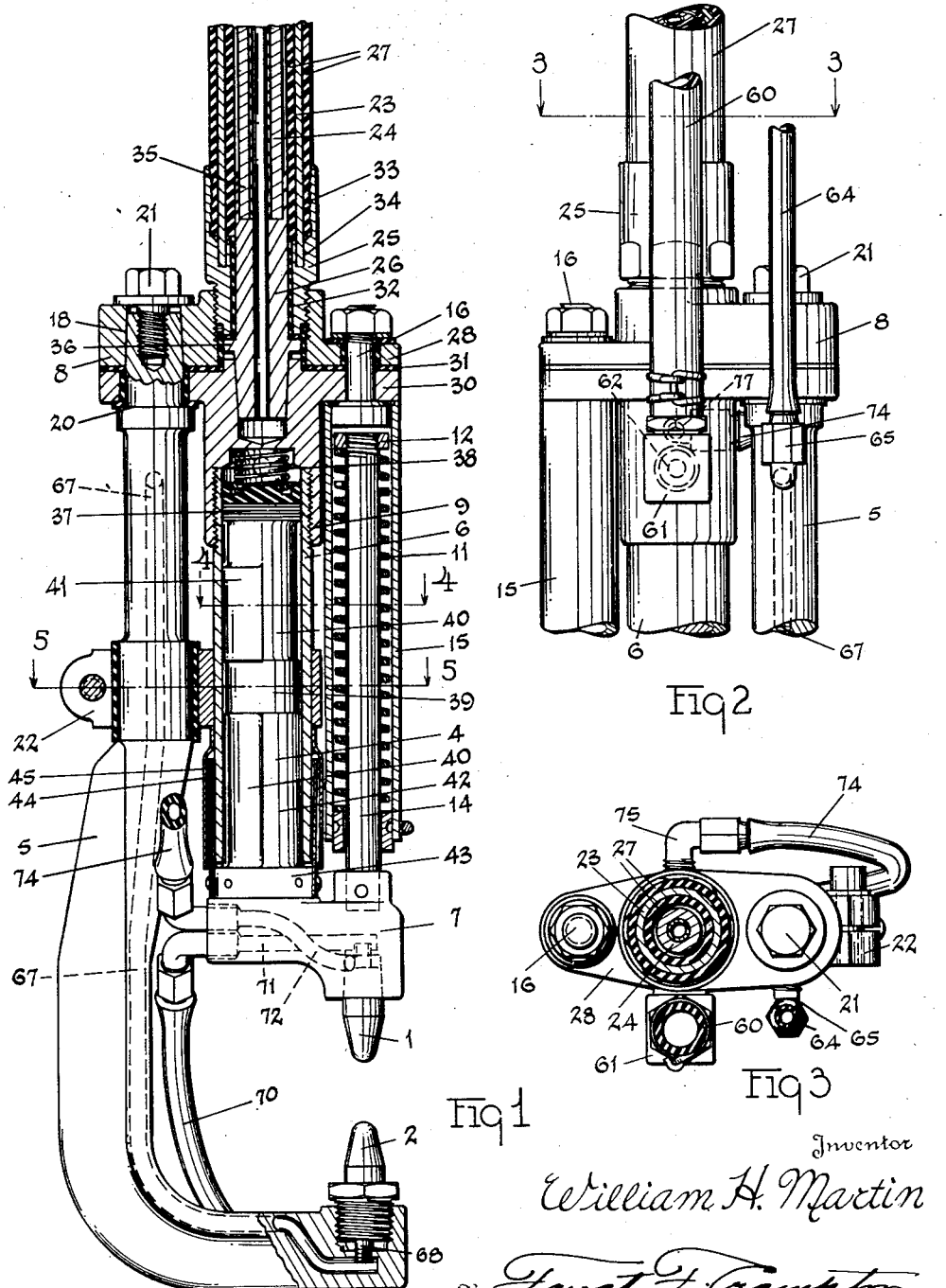
Figure 4:
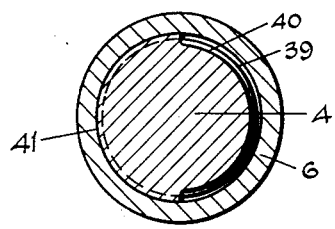
Figure 5:
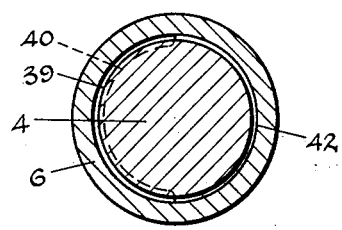
Figure 6:
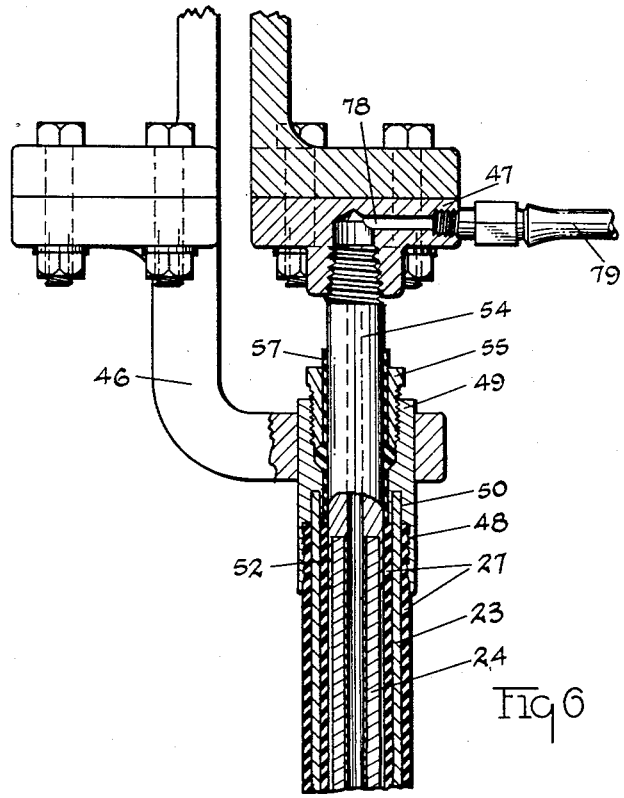

Fig. 1 is a view of a longitudinal section of the welder. Fig. 2 is a view of one side of the upper end of the welder shown in Fig. 1. Fig. 3 is a view of a section taken on the plane of the line 3—3 indicated in Fig. 2. Fig. 4 is a view of a section of the cylinder and piston taken on the plane of the line 4—4 indicated in Fig. 1. Fig. 5 is a view of a section of the cylinder and the piston taken on the plane of the line 5—5 indicated in Fig. 1. Fig. 6 illustrates the electric connection of the tubular electric conductors to the terminals of a secondary of a transformer.

In the form of welder shown in the drawings, a pair of welder electrodes 1 and 2 are mounted, one on the piston 4 and the other on a replaceable bracket 5. The piston 4 is located in a cylinder 6 and is actuated by pressure of a fluid, preferably liquid, to cause the electrodes 1 and 2 to press the work. The electrode 1 is located on an arm 7 which extends laterally from the piston 4, and the end part of the bracket 5 extends substantially parallel to the arm 7 to dispose the electrodes 1 and 2 ex-axially with respect to the piston and the cylinder of the welder.

The head 8 of the cylinder forms a base for assembling the parts of the welder. The head 8 has a tapped socket 9 in which a threaded end of the cylinder may be located to secure the cylinder to the head. A resilient means, that coacts with the cylinder pressure to reciprocate the piston within the cylinder, is connected to the head. An electrode supporting bracket of a desired form, such as the bracket 5, is also connected to the head. One end of each of the conductors is connected to the head to eliminate the cumbersome structure produced by extending the flexible conductors along the sides of the welder to points in the vicinity of the electrodes.

For producing the return movement of the welder piston 1, subsequent to a welding operation, a spring 11 is interposed between a head or nut 12 formed on or secured to the end of a rod 14 and an end part of a sleeve 15. The rod is connected to the arm 7 of the piston. The spring surrounds the rod 14 and is located in the sleeve 15. The sleeve is secured to the head 8 by a bolt 16.

The end of the bracket 5, which supports the electrode 2, is tapered and fits into a tapered opening 18 formed in the head. It is also provided with a shoulder 20 that engages the head when the tapered end is drawn into the head by the bolt 21. The bracket 5 may be also further secured by a split ring clamp 22 which is connected to the central part of the cylinder 6.

The head 8 of the welder is connected to a source of supply of electric current by means of a pair of flexible tubular electric conductors 23 and 24 located concentrically and extending coaxially to the secondary of the transformer that forms the source of supply of welding current. The conductors 23 and 24 are connected to the head by coaxially disposed tubular connectors 25 and 26. Water, which forms the cooling medium, may be directed through the electrodes and the tubular conductors and connectors for maintaining the electrodes and the conductors at a relatively low temperature. The flexible tubular conductor 23 is surface-covered, both interiorly and exteriorly, by suitable electric insulating material 27, such as rubber.

The head 8 of the welder is formed of two parts 28 and 30 that are separated by electric insulating sheet material 31. The parts of the head are clamped together by the bolts 16 and 21. The end part of the conductor 23 is located in a socket 33 formed in the connector 25, and the end of the conductor is secured in a channel 34 by suitable solder, which, when hot, fills the spaces and voids and solders the end of the woven conductor to the connector. The interior surface of the socket 33 may be corrugated to engage the outer layer of insulating material 27. The head part 28 is tapped, and the end of the connector 25 is threaded for connecting the connector to the head.

The connector 26 is provided with a socket 35 in which the end of the conductor 24 is located and secured, as by solder. One end of the connector 26 is tapered and is located in a tapered opening formed in the head part 30. The connector 26 is also provided with a shoulder 36, which is pressed by the end of the connector 25, when it is screwed into the head part 28 of the welder to force the tapered end into the opening in the head part 30. The connectors 25 and 26 are insulated from each other by a suitable insulating material 32. Also the bracket 5 is electrically insulated from the head part 30 by a suitable bushing of insulating material. The electrode 2 is connected through the bracket 5, the head part 28, and the connector 25, to the conductor 23. The electrode 1 is connected through the piston, the cylinder, the head part 30, the connector 26, to the conductor 24, whereby the welding current may be caused to flow through the conductors and the work when the electrodes are pressed against the work by the operation of the cylinder and the piston.

The other ends of conductors 23 and 24 are similarly connected to the terminals 46 and 47 of the secondary of the transformer which constitutes the source of supply of the welding current. The end part of the conductor 23 is located in a socket 48 formed in a connector 49 which is secured to the terminal 46. The end of the conductor protrudes into a channel 50 located in the bottom of the socket where it is soldered to the connector 49. The wall of the socket 48 is corrugated to engage the insulating material 27 surrounding the conductor 23. The end of the conductor 24 is also soldered in a socket 52 formed in the end of a connector 54. The connector 54 is coaxially disposed in the connector 49. The terminal 47 has a tapped opening, and the connector 54 is threaded for securely connecting the connector to the terminal. The connector 49 is provided with a packing ring or sleeve 55 and an insulating tube 57 formed of rubber or similar insulating material is located intermediate the connector 54, the packing sleeve 55, and also intermediate the connectors 54 and 49 in the vicinity of the sockets of the two connectors. Thus, the current induced in the secondary flows through the conductors 23 and 24 to the connectors 25 and 26 which are in turn connected, respectively, through the bracket 5 to the welder electrode 2 and through the cylinder 6 and the piston 4 to the welding point 1.

The piston 4 is formed to efficiently complete the circuit from the cylinder 6 to the electrode 1. The welder electrodes 1 and 2 produce a torque by the high pressure of the electrode 1, when the work is engaged, which operates to cause lateral pressures of the end parts of the piston 4 against the wall of the cylinder to greatly increase the contact pressure and establish a substantially free flow of current through the cylinder and piston, to the welder electrode. The piston 4 is provided with a relatively short head 37 having a diameter slightly less than the cylinder, and a flexible cup washer is connected to the head 37 of the piston which affords a slight free lateral movement of the ends, particularly the lower end, of the piston.

The central part 39 of the piston 4 has a diameter materially less than the diameter of the cylinder and also end parts 40 that have diameters which are less than that of the central part 39. The end parts of the piston have raised contact parts or pads 41 and 42. The pads have substantially cylindrical surfaces that have radii substantially the same as the radius of the inner surface of the cylinder. The surfaces extend arcuately, materially less than 180°. Preferably, the surfaces of the pads are very slightly tapered to enable accurate contact with the cylinder 6 of the welder throughout the area of the contact surfaces of the pads. When the electrode 1 engages the work, the pads at the ends of the piston are pressed against the cylinder wall substantially throughout the area of the pads with a high pressure.

The piston 4 is provided with a shoulder 43 which forms, with the edge of the cylinder, a positive limiting stop to limit the inward movement by the operation of the spring 11. A buffer spring 38 is located intermediate the head 8 of the cylinder and the head 37 of the piston. The spring 38 operates to resiliently reduce the rate of movement of the piston in advance of the engagement of the shoulder 43 with the end edge of the cylinder 6 to cushion the inward movement of the piston produced by the operation of the spring 11, the spring 38 having sufficient rigidity to normally hold the shoulder a very short distance from the end edge of the cylinder counter to the pressure of the spring 11.

Preferably, the shoulder 43 has a diameter slightly greater than the exterior diameter of the cylinder and a sheet metal sleeve 44, which surrounds the end part of the cylinder and the contact pad 42, is secured to the shoulder 43. When, therefore, the piston and the contact pad 42 are moved outwardly with respect to the cylinder to produce engagement of the work by the electrodes 1 and 2, the sleeve 44 prevents dust from depositing on the contact pad 42. If desired, a second cylindrical sleeve 45 may be located on the cylinder and disposed to enclose the sleeve 44 and form, with the sleeve 44, a telescopic shield for the protection of the contact pad 42.

The piston is operated hydraulically by pressure transmitted through oil or other liquid located in a pipe 60 which is connected by a connector 61 to the head 8 that has an opening 62 located above the head of the piston 4 for admission of the liquid into the cylinder. The pipe 60 is connected with a means for producing a high pressure in the liquid confined within the pipe and the cylinder to actuate the piston and produce a welding pressure. Also, any suitable means, well known in the art, may be automatically or manually operated to complete the circuit of the primary and cause the welding current to flow from the terminals 46 and 47 of the secondary to the electrodes 1 and 2 and through the work, when the work is subjected to a required welding pressure.

To maintain the electrodes and the conductors cool, a cooling liquid is conducted through the connectors and the electrodes. In the form of construction shown, a pipe 64 is connected with a source of supply of liquid. The pipe is connected to the bracket 5 by means of a suitable pipe connector 65. The bracket 5 is provided with a passageway 67 that leads to the interior of the welding point 2, which, by means of a tube 68, directs the stream to the end of the point 2. The liquid passes outwardly through a passageway formed in the bracket and through a pipe 70 to the arm 7 of the piston 4, where it is connected to a passageway 71 through which the liquid flows to the welder point 1 and then flows from the welder point 1 through a passageway 72 and a pipe 74 connected to the arm 7 of the piston. The pipe 74 is connected to the head 8 of the cylinder by means of a connector 75. The liquid passes through an opening 77 formed in the head 8 at a point located near the end of the connector 26 and flows through the tubular conductors, the connector 54, and a passageway 78, formed in the secondary terminal 47, and through a pipe 79 to either a suitable reservoir or a point of discharge.

I claim:

1. In a welder, a cylinder and a piston; a pair of electrodes; the cylinder having a two-part head for closing one end of the cylinder, the parts of the head secured together and to the cylinder and insulatingly spaced; means for electrically connecting the parts of the head to the electrodes; a pair of coaxial flexible electric conductors; and a pair of coaxial electric conductor-connectors for connecting the conductors to the head parts, the outer of the conductors connected to one of the head parts and the inner of the conductors connected to the other head part and extended through the other head part.

2. In a welder, a cylinder and a piston; a pair of electrodes; the cylinder having a two-part head for closing one end of the cylinder, the cylinder electrically connected to one of the parts of the head; one of the electrodes mounted on and electrically connected to the piston and through the piston to the cylinder; a bracket member secured on another of the parts of the head; the other of the electrodes mounted on and electrically connected to the bracket; a pair of coaxial flexible electric conductors; and a pair of coaxial electric conductor-connectors mounted in the head for connecting the conductors to the head parts and to the electrodes.

3. In a welder, a cylinder and a piston; a welding point connected to the piston; the cylinder having a two-part cylinder head, the parts of the head connected and insulatingly spaced; a removable bracket secured in and electrically connected to one head part and insulatingly supported in the other head part; the cylinder electrically connected to the other of the head parts; an electrode connected to the bracket; a pair of tubular coaxial conductors; a pair of tubular coaxial connectors for connecting the tubular conductors to the head parts mounted on the cylinder head, one for connecting one conductor to one head part and the other connector for connecting the other conductor to the other head part for directing the flow of a current through the bracket to the electrode and through the cylinder to the work; one of the connectors extending through one head part and into the other connector; and means for directing the flow of a cooling liquid through the conductors, the head, and the electrode.

WILLIAM H. MARTIN.